(12) United States Patent
Okamoto et al.

(10) Patent No.: US 10,971,867 B2
(45) Date of Patent: Apr. 6, 2021

(54) ELECTRICAL CONNECTION BOX

(71) Applicant: Sumitomo Wiring Systems, Ltd., Mie (JP)

(72) Inventors: Noriko Okamoto, Mie (JP); Akihiro Oda, Mie (JP); Masakazu Okumura, Mie (JP); Ryoma Hamada, Mie (JP); Tatsuya Daidoji, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/692,351

(22) Filed: Nov. 22, 2019

(65) Prior Publication Data

US 2020/0185866 A1 Jun. 11, 2020

(30) Foreign Application Priority Data

Dec. 7, 2018 (JP) .............................. JP2018-230280

(51) Int. Cl.
*H01R 13/688* (2011.01)
*H01H 85/22* (2006.01)
*H01H 85/20* (2006.01)

(52) U.S. Cl.
CPC .......... *H01R 13/688* (2013.01); *H01H 85/20* (2013.01); *H01H 85/22* (2013.01); *H01H 2085/208* (2013.01)

(58) Field of Classification Search
None
See application file for complete search history.

(56) References Cited

U.S. PATENT DOCUMENTS

| | | | | |
|---|---|---|---|---|
| 7,193,841 | B2* | 3/2007 | Kita | B60R 16/0239 |
| | | | | 361/641 |
| 7,733,632 | B2* | 6/2010 | Ito | H05K 7/026 |
| | | | | 361/626 |
| 7,927,111 | B2* | 4/2011 | Kita | H05K 7/026 |
| | | | | 439/76.2 |
| 8,070,534 | B2* | 12/2011 | Makino | H01R 43/20 |
| | | | | 439/701 |
| 8,426,752 | B2* | 4/2013 | Hashikura | B60R 16/0238 |
| | | | | 174/528 |
| 8,587,931 | B2* | 11/2013 | Shiraiwa | H05K 1/0263 |
| | | | | 361/630 |
| 9,004,926 | B2* | 4/2015 | Ozawa | H01H 85/2035 |
| | | | | 439/76.2 |

(Continued)

FOREIGN PATENT DOCUMENTS

JP 1997-283004 A 10/1997

*Primary Examiner* — Oscar C Jimenez
(74) *Attorney, Agent, or Firm* — Honigman LLP

(57) ABSTRACT

Provided is an electrical connection box into which a greater number of fuses can be inserted without increasing its size. An electrical connection box for a vehicle includes: an insertion housing into which multiple fuses are to be inserted through an open port on one side; multiple fuse terminals for connecting the fuses in the insertion housing to a substrate; a plate-shaped holding member that opposes the insertion housing from a side opposite to the one side of the insertion housing, and holds the multiple fuse terminals; and a case member that includes a flat plate portion for covering the multiple fuse terminals and has a notch that is formed in the covering portion, the holding member being arranged inside of the notch.

6 Claims, 8 Drawing Sheets

(56) References Cited

U.S. PATENT DOCUMENTS

| | | | | |
|---|---|---|---|---|
| 9,179,560 B2* | 11/2015 | Yoon | ................ | H05K 7/026 |
| 9,325,092 B2* | 4/2016 | Makino | ............ | H01R 13/6608 |
| 10,232,810 B2* | 3/2019 | Okumura | ................ | H02G 3/16 |
| 2008/0254654 A1* | 10/2008 | Ito | ................ | H05K 1/0263 |
| | | | | 439/76.2 |
| 2010/0202120 A1* | 8/2010 | Kita | ................ | H05K 7/026 |
| | | | | 361/752 |
| 2013/0341084 A1* | 12/2013 | Hattori | ................ | H05K 5/0004 |
| | | | | 174/559 |

* cited by examiner

ELECTRICAL CONNECTION BOX

CROSS-REFERENCE TO RELATED APPLICATIONS

This application claims priority of Japanese Patent Application No. JP 2018-230280 filed on Dec. 7, 2018, the contents of which are incorporated herein.

TECHNICAL FIELD

The present disclosure relates to an electrical connection box to be used in a vehicle.

BACKGROUND

Conventionally, an electrical connection box into which fuses are inserted has been mounted in a vehicle.

JP H9-283004A discloses an electrical connection box including a box main body provided with: multiple fuse fitting portions into which fuses are to be fit; multiple fusible link fitting portions into which fusible links are to be fit; and a main fusible link fitting portion into which a main fusible link is to be fit, wherein the fuse fitting portions, the fusible link fitting portions, and the main fusible link fitting portion are sequentially arranged on one surface of the box main body.

JP H9-283004A is an example of related art.

Due to the number of electronic devices mounted in a vehicle increasing in recent years, the number of fuses needed to control the electronic devices has also increased. However, the amount of space in which an electrical connection box can be arranged is limited. Accordingly, it is necessary to devise a method according to which a greater number of fuses can be inserted while suppressing an increase in the size of the electrical connection box.

However, in the above-described electrical connection box, a case is merely disclosed in which one box body includes multiple types of fuse fitting portions corresponding to multiple types of fuses, and the above-described problem cannot be solved.

The present disclosure has been made in view of these circumstances, and it is an object thereof to provide an electrical connection box into which a greater number of fuses can be inserted without increasing the size.

SUMMARY

An electrical connection box according to one aspect of the present disclosure is an electrical connection box for a vehicle, including: an insertion housing into which a plurality of fuses are to be inserted through an open port on one side of the insertion housing; and a plurality of fuse terminals for connecting the fuses in the insertion housing to a substrate, the electrical connection box including: a plate-shaped holding member that opposes the insertion housing from a side opposite to the one side of the insertion housing, and holds the plurality of fuse terminals; and a case member that includes a covering portion for covering the plurality of fuse terminals and has a first notch that is formed in the covering portion, the holding member being arranged inside of the first notch.

Advantageous Effects

According to an aspect of the present disclosure, it is possible to provide an electrical connection box into which a greater number of fuses can be inserted without increasing the size.

DETAILED DESCRIPTION OF PREFERRED EMBODIMENTS

Figure 1:
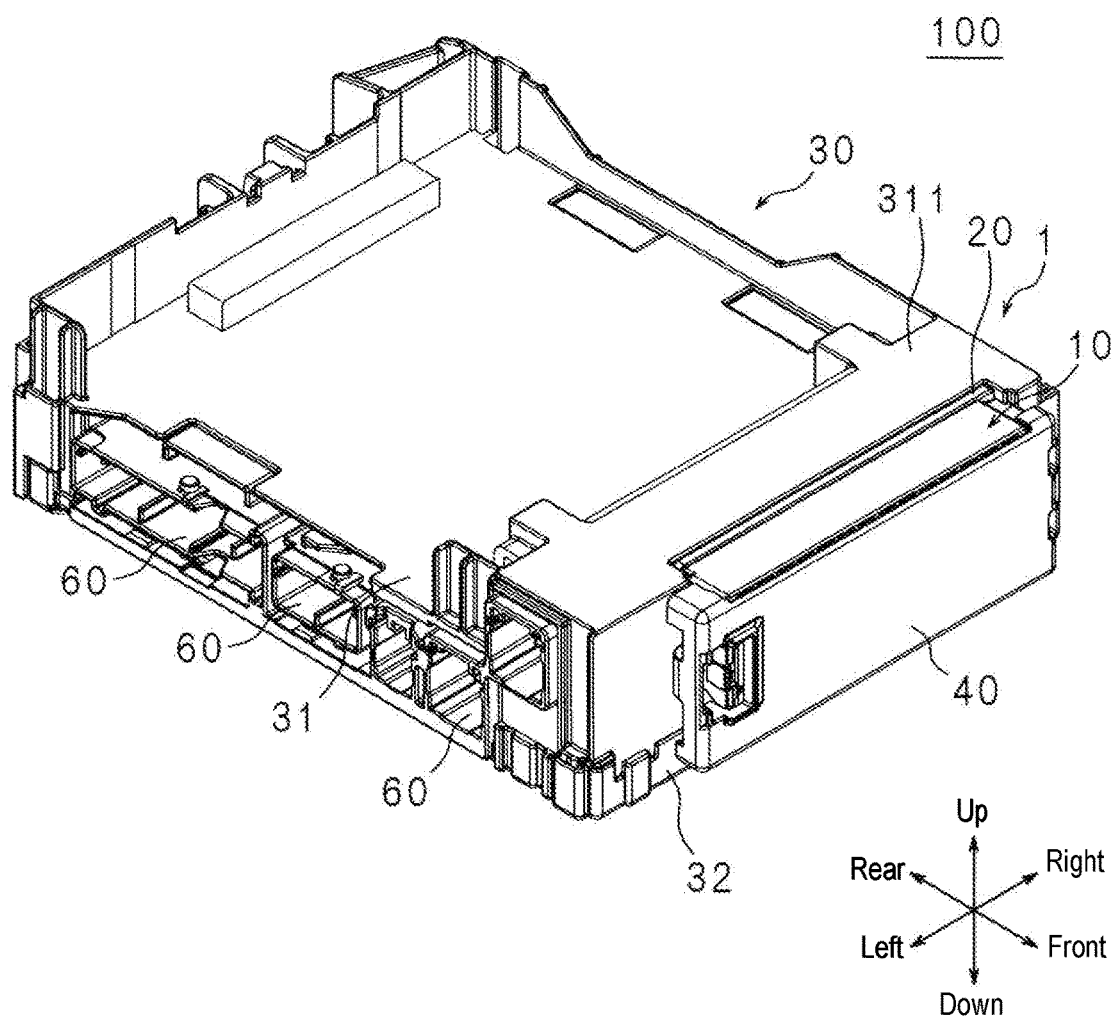
FIG. 1 is a perspective view showing an appearance of an electrical connection box according to the present embodiment.

First, embodiments of the present disclosure will be described in order. At least parts of the embodiments described hereinafter may be combined as needed.

An electrical connection box according to an aspect of the present disclosure is an electrical connection box for a vehicle, including: an insertion housing into which a plurality of fuses are to be inserted through an open port on one side of the insertion housing; and a plurality of fuse terminals for connecting the fuses in the insertion housing to a substrate, the electrical connection box including: a plate-shaped holding member that opposes the insertion housing from a side opposite to the one side of the insertion housing, and holds the plurality of fuse terminals; and a case member that includes a covering portion for covering the plurality of fuse terminals and has a first notch that is formed in the covering portion, the holding member being arranged inside of the first notch.

In the present aspect, the first notch is formed in the covering portion (case member), and the holding member is arranged inside of the notch. For example, if the first notch is not formed, the covering portion needs to be configured to cover the holding member, and the dimension of the covering portion (case member) will increase accordingly. In contrast to this, with the electrical connection box according to an aspect of the present disclosure, the holding member is arranged inside of the covering portion, and therefore the configuration in which the covering portion covers the holding member is not needed, and an increase in the size of the case member can be suppressed.

In an electrical connection box according to an aspect of the present disclosure, the covering portion is flat plate-shaped, one edge portion of the holding member and a side wall portion of the insertion housing engage with the first notch, and an outer surface of the covering portion, a side surface of the one edge portion of the holding member, and an outer surface of the side wall portion of the insertion housing are level.

In the present aspect, the first notch is formed in the covering portion (case member), the one edge portion of the holding member and the side wall portion of the insertion housing engage with the first notch, and at this time, the outer surface of the covering portion, the side surface of the one edge portion of the holding member, and the side wall portion of the insertion housing are level. Accordingly, with the electrical connection box according to an aspect of the present disclosure, the size of the insertion housing can be increased to the maximum limit without increasing the size of the case member.

In an electrical connection box according to an aspect of the present disclosure, the open port is rectangular, the insertion housing has a plurality of rectangular insertion holes into which the fuses are to be inserted, and lengthwise directions of the insertion holes intersect a lengthwise direction of the open port, and three or more insertion hole rows in which the insertion holes are arranged side by side in the lengthwise direction of the open port are formed.

In the present aspect, the lengthwise directions of the insertion holes are made to be orthogonal to the lengthwise direction of the open port, and three or more rows of the insertion holes are formed in the shorter direction of the open port. Accordingly, it is possible to increase the number of fuses to be inserted into the insertion housing compared to the case where the lengthwise directions of the insertion holes are parallel to the lengthwise direction of the open port.

An electrical connection box according to an aspect of the present disclosure includes a lid member that covers the open port of the insertion housing. The lid member has a cuboid box shape with one side open, and a second notch for engaging with the side wall portion of the insertion housing is formed in one wall portion of the lid member.

In the present aspect, the second notch is formed in the one wall portion of the lid member and the side wall portion of the insertion body engages with the second notch.

On the other hand, if the lid member covers the open port in the state in which the insertion housing is fit in the lid member, the lid member needs to have a dimension greater than that of the open port. In contrast to this, with the electrical connection box according to an aspect of the present disclosure, the lid member covers the open port in a state in which the insertion housing is not fit in the lid member and the side wall portion of the insertion housing engages with the second notch of the lid member. Accordingly, it is possible to suppress a case in which the size of the lid member is increased.

In an electrical connection box according to an aspect of the present disclosure, when the side wall portion of the insertion housing engages with the second notch of the lid member, an outer surface of another portion excluding the second notch on the one wall portion of the lid member is level with the outer surface of the side wall portion of the insertion housing.

In the present aspect, the outer surface of the other portion excluding the second notch on the one wall portion of the lid member is level with the outer surface of the side wall portion of the insertion housing, and the side wall portion of the insertion housing engages with the second notch of the lid member. Accordingly, it is possible to suppress a case in which the size of the lid member is increased.

The present disclosure will be described specifically with reference to the drawings indicating the embodiment. The electrical connection box according to the embodiment of the present disclosure will be described hereinafter with reference to the drawings. Note that the present disclosure is not limited to these illustrative examples, but is defined by the claims. Meanings equivalent to the claims and all modifications within the claims are intended to be included.

FIG. 1 is a schematic view showing the appearance of the electrical connection box 100 according to the present embodiment. The electrical connection box 100 is a so-called fuse box into which fuses are inserted, and is mounted in a vehicle.

The electrical connection box 100 includes: a case member 30 that stores a substrate on which electrical components or the like are mounted; a fuse module 1 into which fuses are inserted; and a lid member 40 that covers an open port of the fuse module 1.

Figure 2:
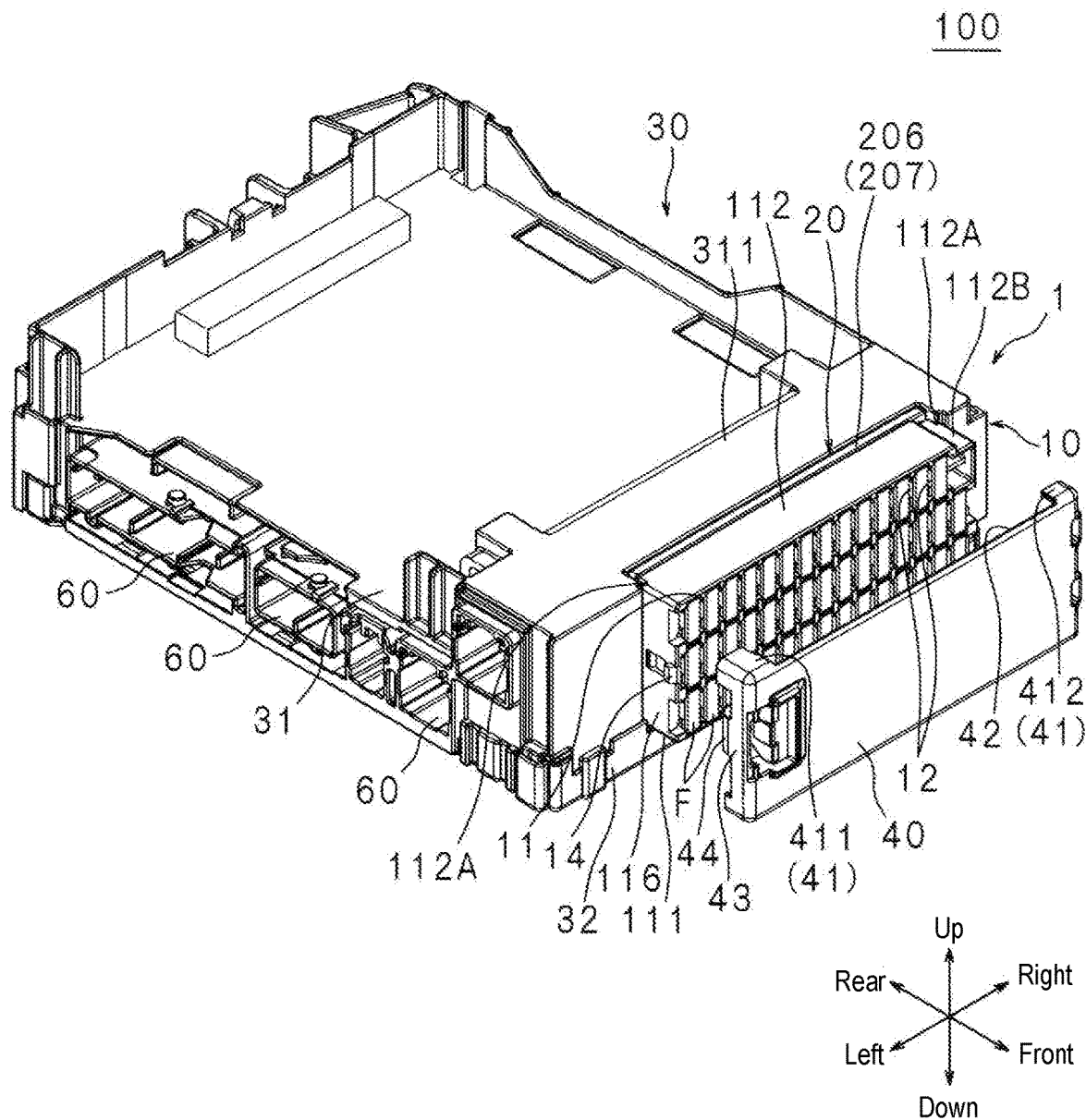
FIG. 2 is a perspective view showing a state in which a lid member has been removed from the electrical connection box according to the present embodiment.

In the present embodiment, for the sake of convenience, "front", "rear", "left", "right", "up", and "down" of the electrical connection box 100 are defined according to the front-rear, left-right, and up-down directions shown in FIGS. 1 and 2. Hereinafter, description will be given using the thus-defined front-rear, left-right, and up-down directions.

The case member 30 includes an upper case portion 31 and a lower case portion 32. The upper case portion 31 has a level difference, and the dimension of the front end portion is greater than that of the other portion in the up-down direction. The upper case portion 31 includes, on its front end portion, a flat plate portion 311 (covering portion) that is flat, and the flat plate portion 311 covers multiple later-described fuse terminals 13. Note that the electrical connection box 100 is provided with multiple connector terminals 60 on the left and right side surfaces.

Figure 3:
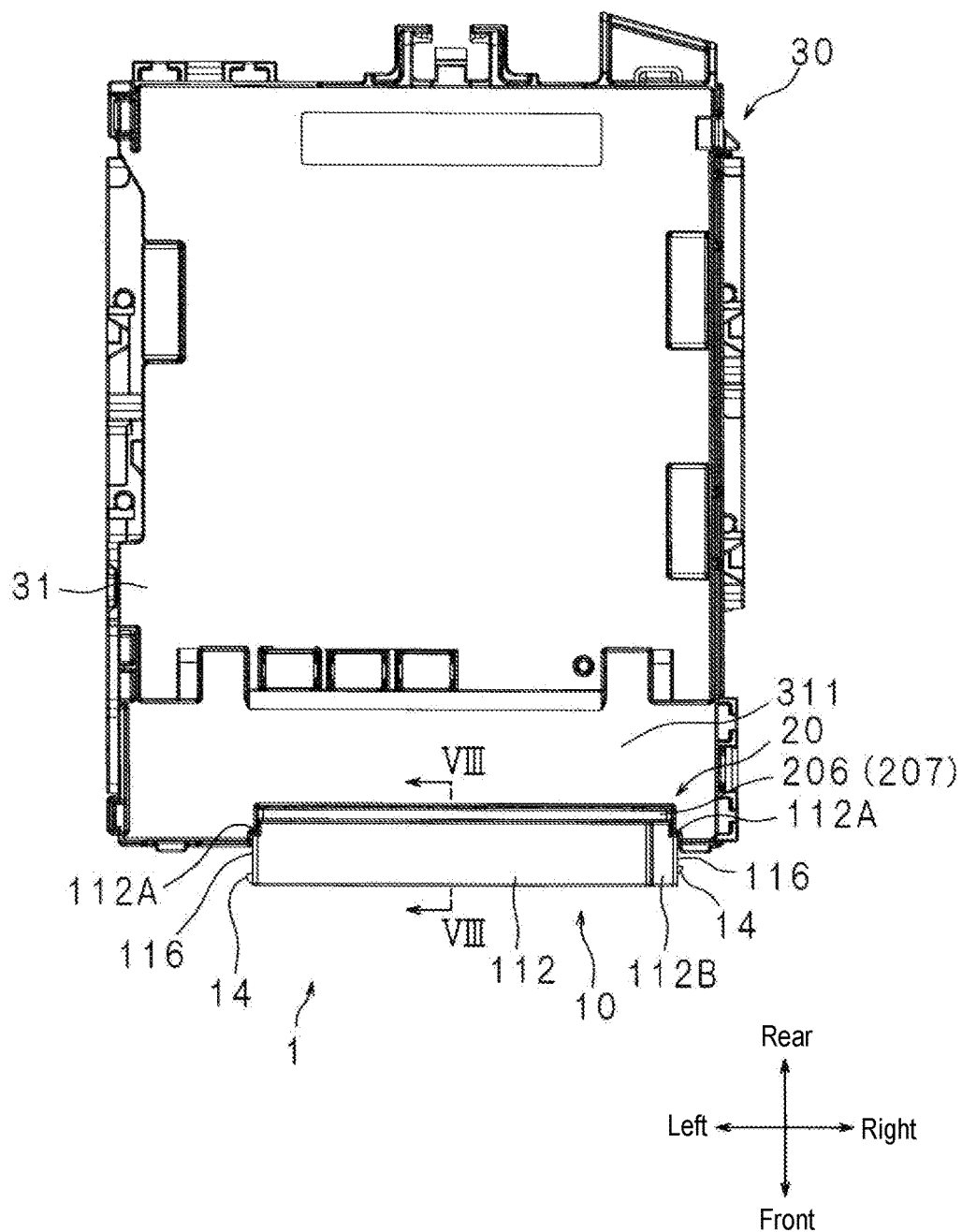
FIG. 3 is a plan view showing a state in which the lid member has been omitted in the electrical connection box according to the present embodiment.
Figure 4:
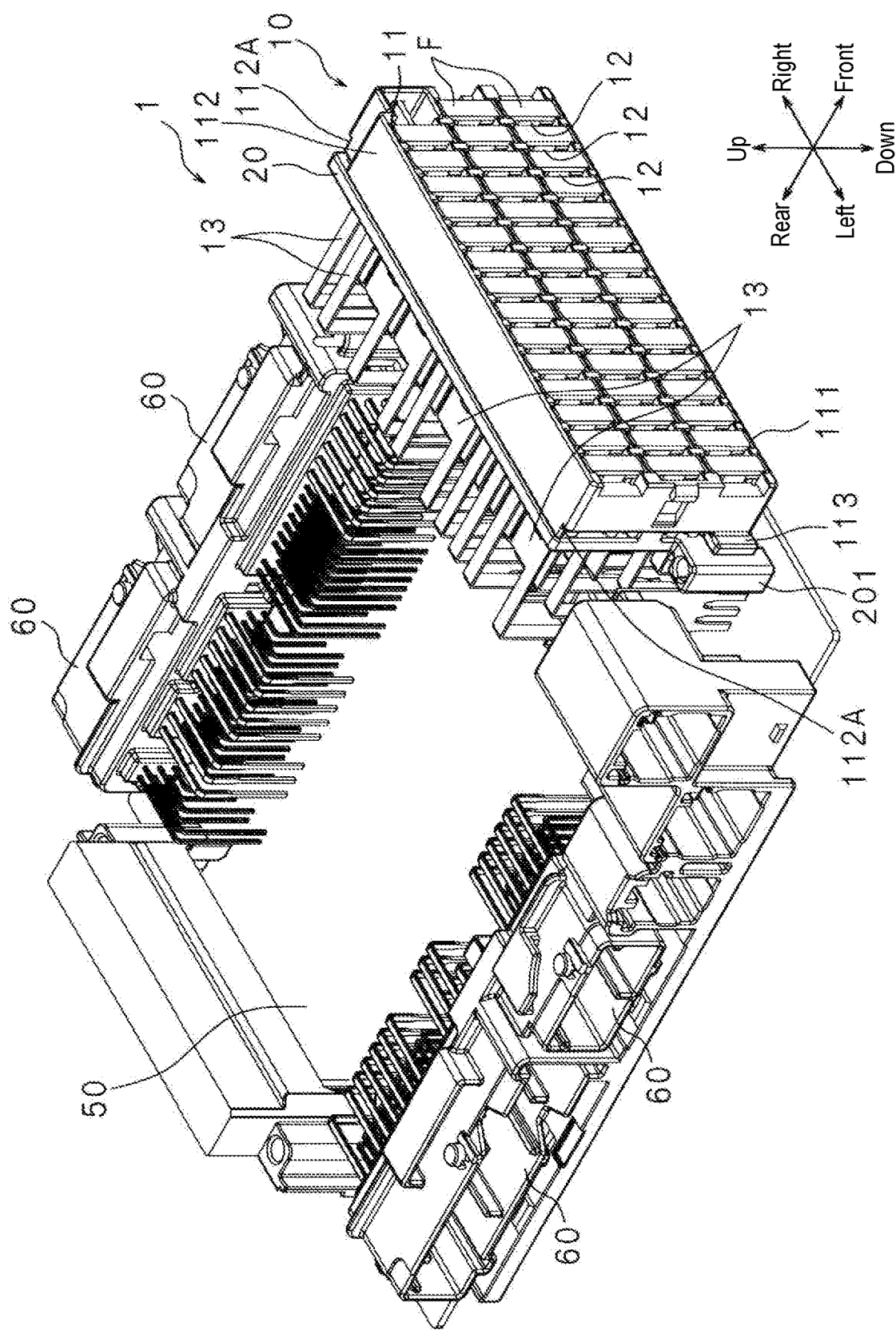
FIG. 4 is a perspective view showing a state in which a case member and a lid member have been omitted in the electrical connection box according to the present embodiment.

FIG. 2 is a perspective view showing a state in which the lid member 40 has been removed in the electrical connection box 100 according to the present embodiment, FIG. 3 is a plan view showing a state in which the lid member 40 has been omitted in the electrical connection box 100 according to the present embodiment, and FIG. 4 is a perspective view showing a state in which the case member 30 and the lid member 40 have been omitted in the electrical connection box 100 according to the present embodiment.

The fuse module 1 includes: an insertion housing 10 in which multiple fuses F are inserted; multiple fuse terminals 13 that connect the fuses F inserted into the insertion housing 10 and the substrate; and a holding member 20 for holding the fuse terminals 13.

The insertion housing 10 has a cuboid box shape in which the entire surface on the front side is open. Rectangular insertion holes 12 into which the fuses F are to be inserted are provided in the form of a matrix inside of the insertion housing 10. That is, the insertion holes 12 are exposed via an open port 11 on the front side of the insertion housing 10.

A substrate 50 is arranged below the insertion housing 10. Specifically, among four wall portions adjacent to the open port 11 in the insertion housing 10, the substrate 50 is provided near a lower wall portion 111 located on the lower side. The substrate 50 is arranged parallel to the lower wall portion 111, spaced apart from the outer surface of the lower wall portion 111. The fuses F inserted into the insertion holes 12 are connected to the substrate 50 by the fuse terminals 13.

The open port 11 is rectangular, and the multiple insertion holes 12 are arranged side by side in the lengthwise direction (left-right direction) of the open port 11 to form rows R. For example, three rows R of the insertion holes 12 arranged side by side in the lengthwise direction of the open port 11 are formed in the shorter direction (up-down direction) of the open port 11. In the rows R of the insertion holes 12, the lengthwise directions of the insertion holes 12 are orthogonal to the lengthwise direction of the open port 11 and the insertion holes 12 are arranged side by side in the lengthwise direction of the open port 11.

In the present embodiment, a case in which there are three rows R of the insertion holes 12 will be described as an example, but there is no limitation to this, and there may be three or more rows R.

In this manner, with the electrical connection box 100 according to the present embodiment, due to the fact that there are 3 or more rows R of the insertion holes 12, more fuses F can be inserted compared to the case where there are two rows R of the insertion holes 12.

Also, in the electrical connection box 100 according to the present embodiment, in all of the rows R of the insertion holes 12, the lengthwise directions of the insertion holes 12 are orthogonal to the lengthwise direction of the open port 11. Accordingly, it is possible to insert a greater number of fuses F compared to the case of including rows R of the insertion holes 12 that are arranged such that the lengthwise directions thereof intersect the shorter direction of the open port 11.

In the insertion housing 10, notches 112A are formed on the upper wall portion 112 (side wall portion) opposing the lower wall portion 111. The upper wall portion 112 is strip-shaped, and the notches 112A are respectively formed at the two rear corners of the four corners of the upper wall portion 112.

Also, an engaged portion 112B that is used when attaching the lid member 40 to the attachment housing 10 is formed on the right end portion of the upper wall portion 112. Specifically, the engaged portion 112B is a flat portion that is provided on the right end of the upper wall portion 112 and is parallel to the upper wall portion 112. The engaged portion 112B is provided continuously in the lengthwise direction of the upper wall portion 112 with a predetermined level difference from the right end of the upper wall portion 112. In other words, in the insertion housing 10, the dimension in the shorter direction (up-down direction) is smaller in the engaged portion 112B. The width by which the dimension is reduced is equal to the thickness of the wall portion 41 on the upper side of the later-described lid member 40.

Furthermore, locking holes 114 for attaching the holding member 20 to the insertion housing 10 are formed in the insertion housing 10. The locking holes 114 are formed at positions corresponding to later-described locking portions 202 of the holding member 20.

The locking holes 114 are formed in wall portions 116 on left and right sides adjacent to the lower wall portion 111 of the insertion housing 10. The locking holes 114 are rectangular through holes that penetrate through the wall portions 116 of the insertion housing 10.

Locking protrusions 14 are respectively provided on the front edges of the left and right wall portions 116. The locking protrusions 14 are provided protruding in a direction that intersects the wall portions 116 at the center in the up-down direction of the left and right wall portions 116. When the lid member 40 is attached to the insertion housing 10, locking hooks 44 of the later-described lid member 40 lock onto the locking protrusions 14.

The lid member 40 has a rectangular box shape with one side open, and has a shape that conforms to the open port 11 of the insertion housing 10. In the lid member 40, notches are formed in the wall portion 41 on one long side and the wall portions 43 on both short sides, among the four wall portions adjacent to the open port.

A notch 42 (second notch) formed on the wall portion 41 on one long side of the lid member 40 has a thin, elongated rectangular shape, and when the lid member 40 is attached to the insertion housing 10, the lid member 40 engages with the upper wall portion 112 of the insertion housing 10. Specifically, the dimension of the notch 42 in the lengthwise direction (left-right direction) of the lid member 40 is equal to the dimension of the upper wall portion 112 of the insertion housing 10. Accordingly, when the lid member 40 is attached to the insertion housing 10, the upper wall portion 112 engages with the notch 42. At this time, the left end portion and the right end portion of the upper wall portion 112 come into contact with both edges in the lengthwise direction of the notch 42.

Also, notches formed on the wall portions 43 on the short sides of the lid member 40 are strip-shaped, and locking hooks 44 are provided in the center in the lengthwise direction of the notches. The locking hooks 44 have hook shapes and are provided protruding in the direction along the surface of the wall portion 43. When the lid member 40 is attached to the insertion housing 10, the locking hooks 44 lock onto the locking protrusions 14 of the insertion housing 10.

Furthermore, when the lid member 40 is attached to the insertion housing 10, among other portions 411 and 412 excluding the notch 42 on the wall portion 41 of the lid member 40, the other portion 412 on the right side engages with the engaged portion 112B of the insertion housing 10. That is, when the lid member 40 is attached to the insertion housing 10, the left end portion and the right end portion of the upper wall portion 112 come into contact with the edge of the other portion 411 and the edge of the other portion 412 and the inner surface of the other portion 412 comes into contact with the outer surface of the engaged portion 112B.

As described above, the engaged portion 112B is provided continuously with a predetermined level difference from the right end of the upper wall portion 112, and the width of the level difference is equal to the thickness of the other portion 412 of the lid member 40. Accordingly, if the lid member 40 is attached to the insertion housing 10, the outer surfaces of the other portions 411 and 412 are level with the outer surface of the upper wall portion 112.

On the other hand, if the lid member 40 is attached to the insertion housing 10 due to the insertion housing 10 being fit into the lid member 40, the wall portion 41 (other portions 412 and 411) is located above the upper wall portion 112 of the insertion housing 10.

In contrast to this, in the electrical connection box 100 according to the present embodiment, if the notch 42 is formed in the wall portion 41 on the one long side of the lid member 40 and the lid member 40 is attached to the insertion housing 10, the notch 42 engages with the upper wall portion 112 of the insertion housing 10. At this time, the outer surfaces of the other portions 411 and 412 are level with the outer surface of the upper wall portion 112. Accordingly, the dimension of the electrical connection box 100 in the direction along the shorter direction of the lid member 40 can be made smaller by an amount corresponding to the thickness of the wall portion 41 (other portions 411 and 412).

Figure 5:
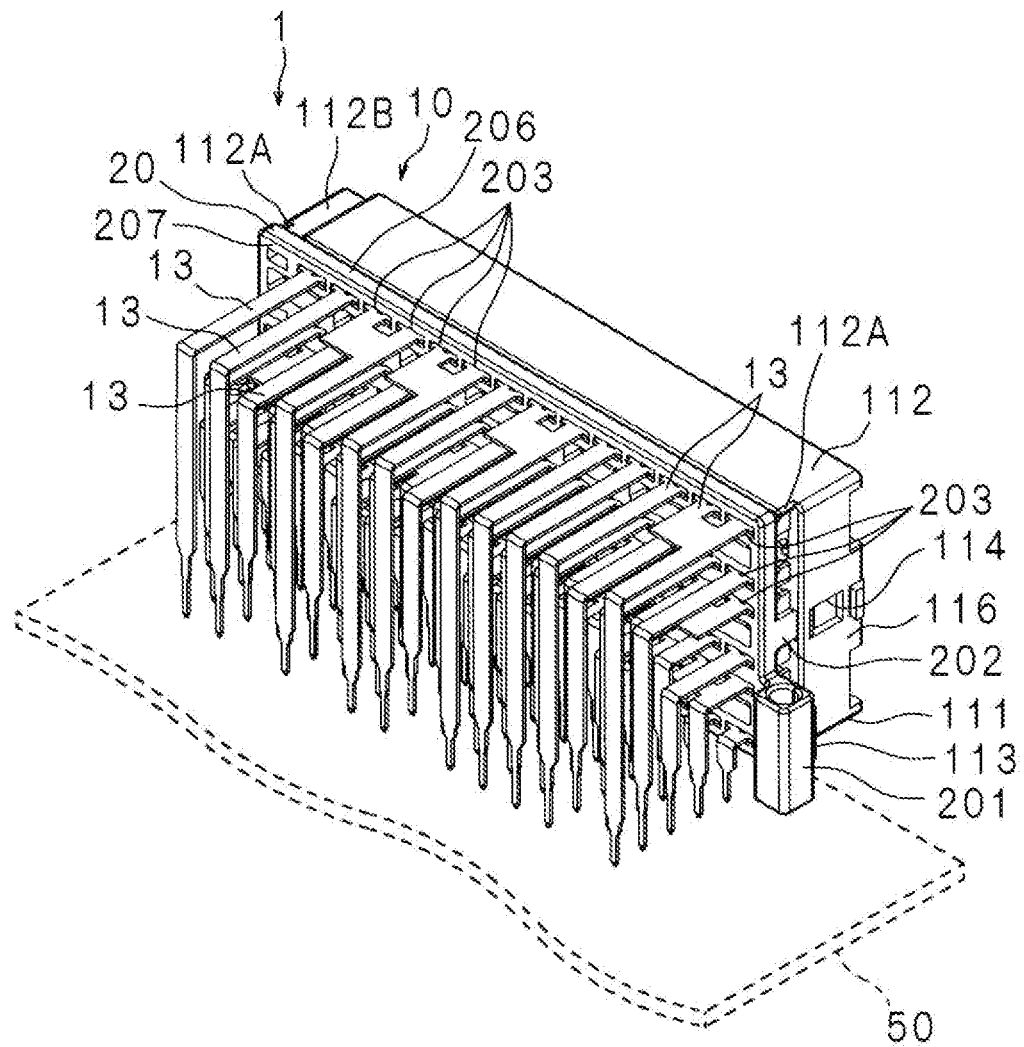
FIG. 5 is a perspective view showing a rear side of the fuse module of the electrical connection box according to the present embodiment.
Figure 6:
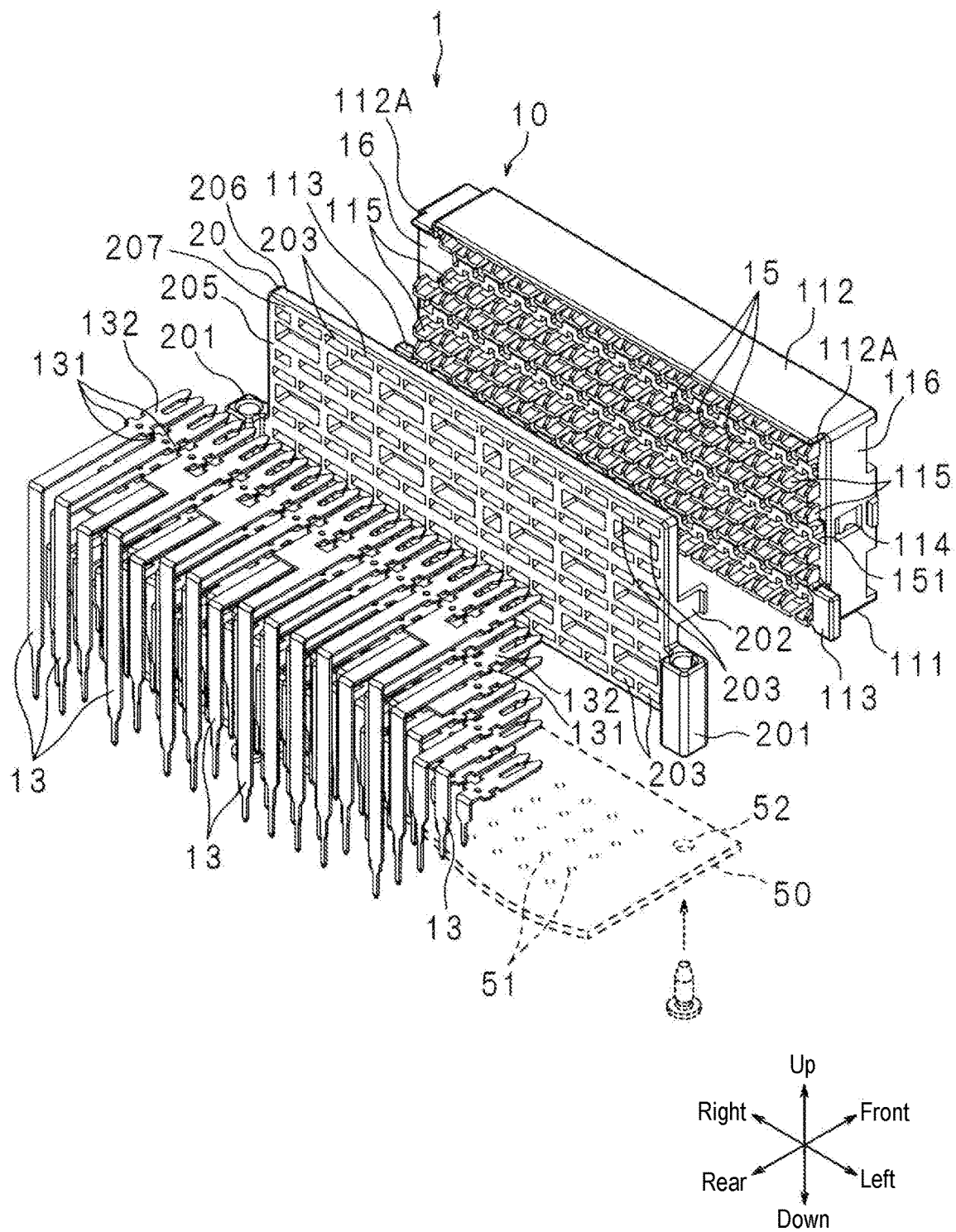
FIG. 6 is an exploded view of the fuse module of the electrical connection box according to the present embodiment.

FIG. 5 is a perspective view showing the rear side of the fuse module 1 of the electrical connection box 100 according to the present embodiment, and FIG. 6 is an exploded view of the fuse module 1 of the electrical connection box 100 according to the present embodiment. In FIGS. 5 and 6, the substrate 50 is indicated by a broken line for convenience in the description.

Multiple through holes 15 into which end portions 132 on one side of the fuse terminals 13 are to be inserted are formed in the rear surface 16 of the insertion housing 10. The end portions 132 on one side of the fuse terminals 13 are inserted into the insertion housing 10 via the through holes 15.

Also, near the through holes 15, the rear surface 16 is provided with guide portions 115 that guide the insertion of the fuse terminals 13 into the through holes 15. The guide portions 115 are approximately gutter-shaped, and are provided protruding from the rear surface 16 to the holding member 20. The multiple guide portions 115 are provided side by side in the lengthwise direction of the rear surface 16. Accordingly, during work for assembling the electrical connection box 100, a worker can easily insert the end portions 132 on one side of the fuse terminals 13 into the through holes 15 by using the guide portions 115.

The fuse terminals 13 are composed of thin plate materials made of a conductive metal. The fuse terminals 13 have bent portions at intermediate locations, and for example, are approximately L-shaped. As described above, the end portions 132 on one side of the fuse terminals 13 are inserted into the through holes 15 of the rear surface 16. In some of the multiple fuse terminals 13, the end portions 132 on one side are divided into two. The end portions 132 on one side of the fuse terminals 13 are connected to the fuses F inserted into the insertion housing 10. Also, the end portions on the other side of the fuse terminals 13 are bent downward, that is, toward the substrate 50, are inserted into the through holes 51 of the substrate 50, and are connected to the substrate 50 through soldering, for example.

The fuse terminals 13 are provided such that the side surfaces adjacent to the main surface, which have large areas, face leftward or rightward. In other words, in each fuse terminal 13, the thickness direction of the portion on one side with respect to the bent portion and the thickness direction of the portion on the other side with respect to the bent portion intersect each other.

Also, in the rear surface 16, guide holes 151 that guide the insertion of the locking portions 202 of the holding member 20 are formed in regions near the locking holes 114, which are the edge portions adjacent to the wall portions 116 on the left and right sides.

Accordingly, during work for assembling the electrical connection box 100, the worker can attach the holding member 20 to the insertion housing 10 by inserting the locking portions 202 of the holding member 20 into the guide holes 151 of the insertion housing 10 and locking the locking portions 202 in the locking holes 114.

Furthermore, in the insertion housing 10, the wall portions 116 on the left and right sides are provided with holding plate portions 113 that hold the holding member 20. The holding plate portions 113 have rectangular plate shapes and are provided protruding in a direction intersecting the wall portions 116, from the rear edges of the wall portions 116 on the left and right sides of the insertion housing 10. The holding plate portions 113 are provided on the lower ends of the rear edges of the wall portions 116 and hold the holding member 20 by coming into contact with later-described screw tubes 201 of the holding member 20.

The holding member 20 has a rectangular plate shape of a predetermined thickness, and is arranged such that a first surface on the front side opposes the rear surface 16 of the insertion housing 10. The holding member 20 is composed of insulating plastic or the like, and holds the fuse terminals 13. Specifically, the holding member 20 holds only the end portions 132 on one side toward the insertion housing 10 of the multiple fuse terminals 13.

The holding member 20 has multiple insertion holes 203 that penetrate through the holding member 20 in the thickness direction. The number of insertion holes 203 that are formed is the same as the number of fuse terminals 13, and the insertion holes 203 are formed at positions corresponding to the end portions 132 on one side of the fuse terminals 13. That is, the insertion holes 203 are provided side by side in the lengthwise direction of the holding member 20.

During work for assembling the electrical connection box 100, the end portions 132 on one side of the fuse terminals 13 are inserted into the insertion holes 203. That is, the end portions 132 on one side of the fuse terminals 13 are inserted into the through holes 15 of the insertion housing 10 via the insertion holes 203.

On the other hand, retaining portions 131 are provided protruding along the main surface on the side surfaces of the end portions 132 on one side of the fuse terminals 13. Due to the retaining portions 131 being press-fit into the insertion holes 203, the end portions 132 on one side of the fuse terminals 13 can be prevented from coming out of the through holes 15 of the insertion housing 10.

Also, in the holding member 20, the locking portions 202 for attaching the holding member 20 to the insertion housing 10 are provided on the first surface opposing the rear surface 16 of the insertion housing 10. The locking portion 202 is approximately hook-shaped. The locking portions 202 are provided extending in the direction intersecting the first surface, which is rectangular, from the edges on the two short sides of the first surface.

If the holding member 20 is to be attached to the insertion housing 10, as described above, the locking portions 202 of the holding member 20 are inserted into the guide holes 151 of the insertion housing 10 and lock into the locking holes 114. At this time, among the edge portions of the holding member 20, a side surface 206 of an edge portion 207 (one edge portion) on the upper side, that is, toward the flat plate portion 311 of the upper case portion, is level with the outer surface of the upper wall portion 112 of the insertion housing 10, and the side surface of the edge portion on the lower side is level with the outer surface of the lower wall portion 111.

As described above, if the lid member 40 is attached to the insertion housing 10, the outer surfaces of the other portions 411 and 412 of the lid member 40 are level with the outer surface of the upper wall portion 112 of the insertion housing 10. Furthermore, the side surface 206 of the edge portion 207 on the upper side among the edge portions of the holding member 20 is level with the outer surface of the upper wall portion 112 of the insertion housing 10. That is, the outer surfaces of the other portions 411 and 412 of the lid member 40, the outer surface of the upper wall portion 112 of the insertion housing 10, and the side surface 206 of the edge portion 207 of the holding member 20 are level (see FIG. 8).

Accordingly, as described above, the dimension of the electrical connection box 100 in the direction along the shorter direction of the lid member 40 can be reduced by an amount corresponding to the thickness of the wall portion 41 (other portions 412 and 411).

Furthermore, the screw tubes 201 for fixing the holding member 20 to the substrate 50 are formed on the side surfaces of both short sides of the first surface. The screw tubes 201 have quadrangular tube shapes that extend in the up-down direction, and screw holes are formed on the inner sides thereof. The screw tubes 201 are provided such that the outer surfaces on one side are level with the first surface.

In the substrate 50, screw through holes 52 are formed at positions corresponding to the screw tubes 201. Accordingly, during work for assembling the electrical connection box 100, the fixing member 20 is fixed to the substrate 50 by inserting screws through the screw through holes 52 and screwing them into the screw holes of the screw tubes 201. At this time, the holding member 20 is fixed in a state of being spaced apart from the substrate 50.

Note that the holding plate portions 113 of the insertion housing 10 come into contact with the outer surfaces on one side of the screw tubes 201 of the holding member 20. The holding member 20 is held reliably due to the locking between the locking portions 202 and the locking holes 114, and due to the contact between the screw tubes 201 and the holding plate portions 113.

Figure 7:
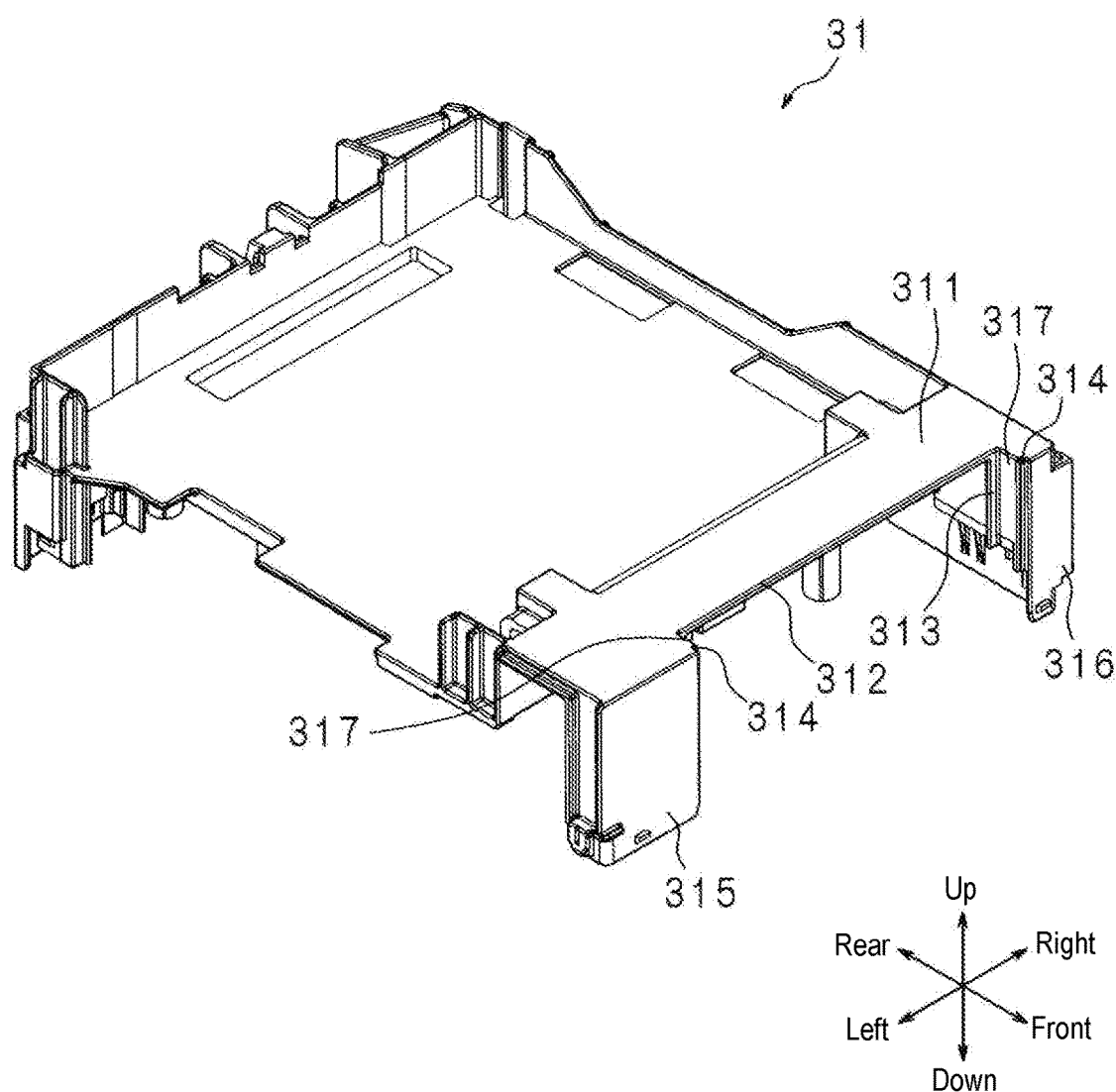
FIG. 7 is a perspective view showing an upper case portion of the electrical connection box according to the present embodiment.

FIG. 7 is a perspective view showing the upper case portion 31 of the electrical connection box 100 according to the present embodiment. As described above, the upper case portion 31 includes a flat plate portion 311 at its front end portion. Also, the flat plate portion 311 has a notch 312 (first notch) at the approximate center of the edge on the front side. The notch 312 has a strip shape whose longitudinal direction is the direction along the edge on the front side.

The rear portions of the holding member 20 and the insertion housing 10 are arranged inside of the notch 312 (see FIGS. 1 and 2). The dimension in the lengthwise direction of the notch 312 is approximately the same as the dimension in the lengthwise direction of the holding member 20 and the dimension in the lengthwise direction of the insertion housing 10, and the dimension in the shorter direction of the notch 312 is greater than the thickness of the holding member 20.

That is, if the holding member 20 and the rear portion of the insertion housing 10 are arranged inside of the notch 312, the edge portion 207 (side surface 206) of the holding member 20 and the upper wall portion 112 of the insertion housing engage with the notch 312.

Figure 8:
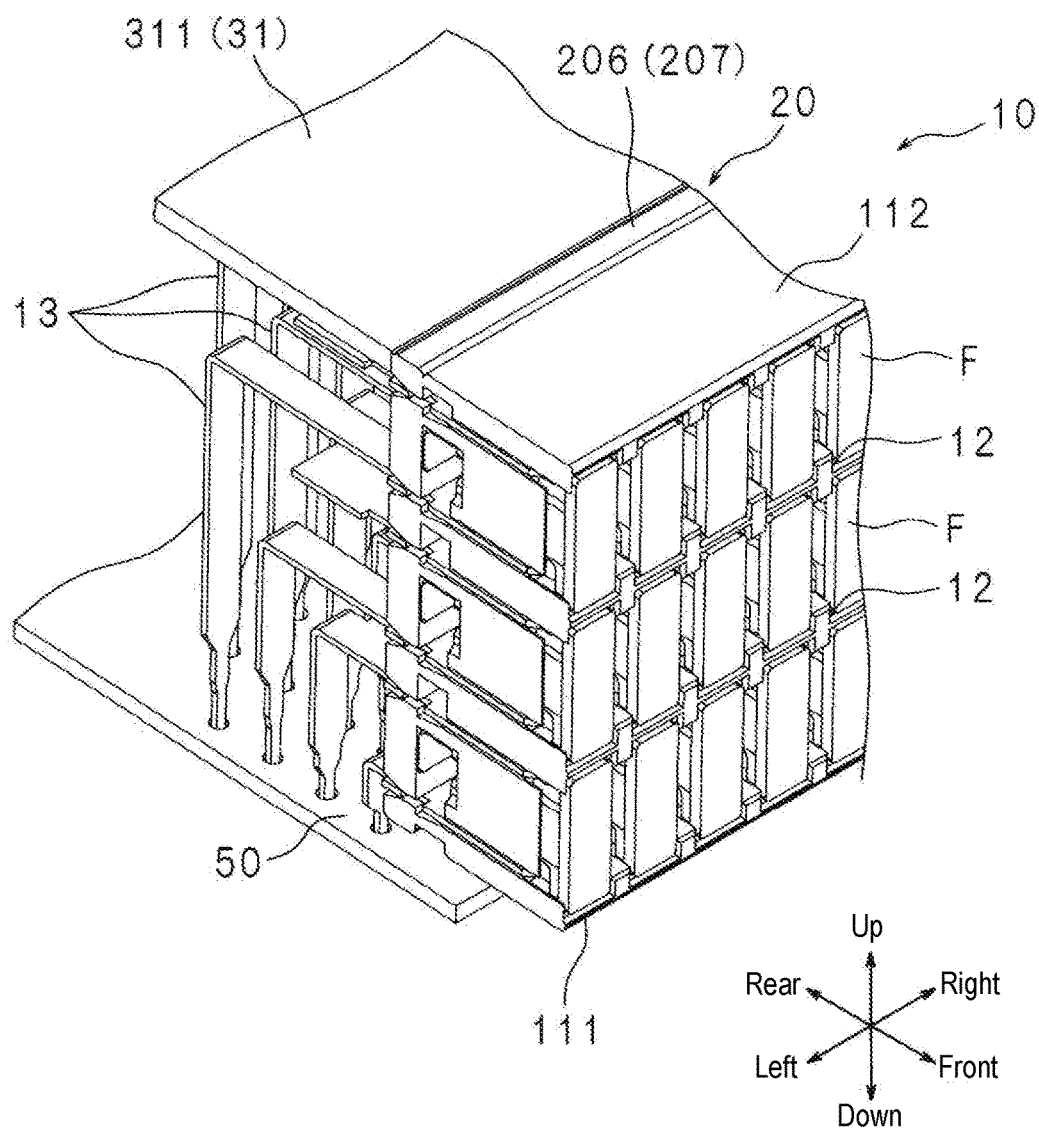
FIG. 8 is a vertical cross-sectional view taken along line VIII-VIII in FIG. 3.

FIG. 8 is a vertical cross-sectional view taken along line VIII-VIII in FIG. 3.

When the holding member 20 and the rear portion of the insertion housing 10 are arranged inside of the notch 312, that is, after the electrical connection box 100 is assembled, the outer surface of the flat plate portion 311, the side surface 206 of the edge portion 207 of the holding member 20, and the outer surface of the upper wall portion 112 of the insertion housing 10 are level.

That is, in the electrical connection box 100 of the present embodiment, the outer surfaces of the other portions 411 and 412 of the lid member 40, the outer surface of the upper wall portion 112 of the insertion housing 10, the side surface 206 of the edge portion 207 of the holding member 20, and the outer surface of the flat plate portion 311 are level.

Accordingly, as described above, the dimension of the electrical connection box 100 in the direction along the shorter direction of the lid member 40 can be reduced by an amount corresponding to the thickness of the wall portion 41 (other portions 412 and 411). Accordingly, the electrical connection box 100 can be made compact.

At the front edge of the flat plate portion 311, front plate portions 315 and 316 are provided extending in a direction intersecting the flat plate portion 311 at portions excluding the notch 312, that is, on both sides of the notch 312. The insertion housing 10 is arranged between the front plate portions 315 and 316 (see FIGS. 1 and 2). That is, the insertion housing 10 is arranged such that the wall portions 116 on the left and right sides of the insertion housing 10 intersect the front plate portions 315 and 316.

Also, regulation plate portions 317 are provided extending in a direction intersecting the flat plate portion 311 from both edges on the short sides of the notch 312. That is, among the two regulation plate portions 317, the regulation plate portion 317 on the left side is adjacent to the front plate portion 315 and the regulation plate portion 317 on the right side is adjacent to the front plate portion 316.

Furthermore, holding pieces 313 are provided extending in a direction orthogonal to the flat plate portion 311 from both end portions on the edges on the long side of the notch 312. That is, the holding pieces 313 intersect the regulation plate portions 317 and the holding pieces 313 are provided so as to be adjacent to the regulation plate portions 317.

The regulation plate portions 317 and the holding pieces 313 are both approximately strip-shaped, and the dimensions in the lengthwise direction, that is, the up-down direction, are smaller than those of the front plate portions 315 and 316. Also, the dimensions in the shorter directions of the regulation plate portions 317 are greater than the dimensions in the shorter directions of the holding pieces 313.

When the holding member 20 is arranged inside of the notch 312, the regulation plate portion 317 comes into contact with the side surfaces on the short side of the holding member 20 (the first surface). That is, the holding member 20 is sandwiched by the two regulation plate portions 317. At this time, the holding pieces 313 come into contact with a second surface on the side opposite to the first surface of the holding member 20. That is, the holding pieces 313 hold the holding member 20 from the second surface side.

As described above, the holding member 20 is held by the holding plate portions 113 from the first surface side, and is held by the holding pieces 313 from the second surface side as described above. In other words, the holding member 20 is sandwiched by the holding pieces 313 and the holding plate portions 113.

Due to having this kind of configuration, the holding member 20 is held reliably in the electrical connection box 100 according to the present embodiment. Accordingly, the holding member 20 can securely hold the multiple fuse terminals 13 while holding only the end portions 132 on one side of the fuse terminals 13.

Note that positioning portions 314 obtained by cutting out the edge created by the regulation plate portion 317 and the front plate portion 315 and the edge created by the regulation plate portion 317 and the front plate portion 316 into rectangular shapes are provided in the upper case portion 31. During work for assembling the electrical connection box 100, the position of the insertion housing 10 is determined due to the notch 112A of the upper wall portion 112 and the positioning portion 314 engaging with each other. Accordingly, the insertion housing 10 is arranged accurately.

The embodiments disclosed herein are illustrative in all respects, and are not to be construed as limiting. The scope of the present disclosure is defined not by the above-described meaning, but by the claims, and meanings equivalent to the claims and all modifications within the claims are intended to be included.

What is claimed is:

1. An electrical connection box for a vehicle, including: an insertion housing into which a plurality of fuses are to be inserted through an open port on one side of the insertion housing; and a plurality of fuse terminals for connecting the fuses in the insertion housing to a substrate, the electrical connection box comprising:

a plate-shaped holding member that opposes the insertion housing from a side opposite to the one side of the insertion housing, and holds the plurality of fuse terminals; and a case member that includes a covering portion for covering the plurality of fuse terminals, the covering portion including a flat plate-shaped portion and a pair of front plates, the flat plate-shaped portion defining a top of the cover, the pair of front plates disposed on each side of the covering portion and orthogonal to the flat plate-shaped portion, the flat plate-shaped portion having a peripheral edge, the peripheral edge is disposed between the pair of front plates and is recessed with respect to the pair of front plates so as to define a first notch, the holding member being arranged inside of the first notch.

2. The electrical connection box according to claim 1, wherein
one edge portion of the holding member and a side wall portion of the insertion housing engage with the first notch, and
an outer surface of the covering portion, a side surface of the one edge portion of the holding member, and an outer surface of the side wall portion of the insertion housing are level.

3. The electrical connection box according to claim 2, comprising
a lid member that covers the open port of the insertion housing,
wherein the lid member has a cuboid box shape with one side open, and a second notch for engaging with the side wall portion of the insertion housing is formed in one wall portion of the lid member.

4. The electrical connection box according to claim 3, wherein
when the side wall portion of the insertion housing engages with the second notch of the lid member, an outer surface of another portion excluding the second notch on the one wall portion of the lid member is level with the outer surface of the side wall portion of the insertion housing.

5. The electrical connection box according to claim 2, wherein
the open port is rectangular,
the insertion housing has a plurality of rectangular insertion holes into which the fuses are to be inserted, and
lengthwise directions of the insertion holes intersect a lengthwise direction of the open port, and three or more insertion hole rows in which the insertion holes are arranged side by side in the lengthwise direction of the open port are formed.

6. The electrical connection box according to claim 1, wherein
the open port is rectangular,
the insertion housing has a plurality of rectangular insertion holes into which the fuses are to be inserted, and
lengthwise directions of the insertion holes intersect a lengthwise direction of the open port, and three or more insertion hole rows in which the insertion holes are arranged side by side in the lengthwise direction of the open port are formed.

* * * * *